United States Patent
Thomas

(10) Patent No.: US 9,898,919 B2
(45) Date of Patent: Feb. 20, 2018

(54) KEYPAD PROJECTION

(71) Applicant: Vivint, Inc., Provo, UT (US)

(72) Inventor: Jeffrey G. Thomas, Draper, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 15/390,485

(22) Filed: Dec. 24, 2016

(65) Prior Publication Data

US 2017/0178489 A1    Jun. 22, 2017

Related U.S. Application Data

(63) Continuation of application No. 14/553,075, filed on Nov. 25, 2014, now Pat. No. 9,530,302.

(51) Int. Cl.
  *G08B 21/22* (2006.01)
  *H04L 12/28* (2006.01)
  *H04W 4/00* (2018.01)

(52) U.S. Cl.
  CPC .......... *G08B 21/22* (2013.01); *H04L 12/2816* (2013.01); *H04W 4/005* (2013.01)

(58) Field of Classification Search
  CPC .................................................. G07C 9/00111
  USPC .................. 340/539.23, 573.1, 686.1, 686.6
  See application file for complete search history.

(56) References Cited

U.S. PATENT DOCUMENTS

| | | |
|---|---|---|
| 2004/0100386 A1 | 5/2004 | Tendler |
| 2006/0176281 A1 | 8/2006 | Bennett et al. |
| 2007/0130692 A1 | 6/2007 | Lemire et al. |
| 2010/0146461 A1 | 6/2010 | Ryu et al. |
| 2011/0128223 A1 | 6/2011 | Lashina et al. |
| 2011/0211110 A1 | 9/2011 | Doublet |
| 2012/0179915 A1 | 7/2012 | Horn et al. |
| 2012/0229249 A1* | 9/2012 | Gritti ............... G01S 15/04 340/4.34 |
| 2014/0035850 A1 | 2/2014 | Shin et al. |
| 2014/0266669 A1 | 9/2014 | Fadell et al. |
| 2015/0185841 A1* | 7/2015 | Levesque ........... G06F 3/016 715/702 |
| 2015/0229883 A1 | 8/2015 | Lin et al. |
| 2015/0233595 A1 | 8/2015 | Fadell et al. |
| 2015/0339870 A1 | 11/2015 | Cojocaru et al. |

\* cited by examiner

*Primary Examiner* — Kevin Kim
(74) *Attorney, Agent, or Firm* — Holland & Hart LLP

(57) ABSTRACT

A method for security and/or automation systems is described. In one embodiment, the method may include detecting a proximity of a user at a home automation device. The method may further include projecting an external display of home automation system information from the home automation device onto a surface. In some embodiments, the external display may be projected based, at least in part, on the detected proximity of the user at the home automation device.

20 Claims, 9 Drawing Sheets

KEYPAD PROJECTION

CROSS-REFERENCE TO RELATED APPLICATIONS

The present application is a continuation of U.S. patent application Ser. No. 14/553,075, titled: "Keypad Projection", filed on Nov. 25, 2014. The disclosure of which is incorporated by reference herein in its entirety.

BACKGROUND

The present disclosure, for example, relates to security and/or automation systems, and more particularly to a system for pairing projection technologies with home automation system control panels and door locking mechanisms in order to project messages and interactive keypads onto surfaces.

Security and automation systems are widely deployed to provide various types of communication and functional features such as monitoring, communication, notification, and/or others. These systems may be capable of supporting communication with a user through a communication connection or a system management action.

Existing laser projection technologies often require the user to push a button to turn the system on and off, such that users may only receive information from or interact with the system directly. Additionally, existing home automation devices or panels often include large rubber or plastic keypads that may detract from the visual appeal of the panel and may prevent the panel from blending into the home's décor. Furthermore, users are typically required to interact with the panel directly at the keypad in order to access any available home automation system messages or status updates. Similarly, keyless door lock systems often include large, unsightly keypads that may attract the attention of burglars.

SUMMARY

One aspect of the disclosure relates to systems, methods, and related devices for providing the interactive capabilities of home automation devices or panels and keyless locks without the need for keypads. By providing a projected keypad for home automation devices or panels and door locks, the aesthetic appeal of the panel, and the discreetness of a basic keyed lock, may be maintained while providing additional functionalities to the user. For example, in addition to projecting a keypad, the home automation device may project home automation system data, updates, messages, and reminders to the user on a wall, floor, door or ceiling, such that the user may quickly receive relevant home information without the need to scroll through messages piecemeal on the home automation system panel screen.

Laser-projected keypad technology typically requires that users activate the projection by turning the device on and off locally. This requirement may limit the accessibility of the projection for users passing by the device but not interacting directly with the device. Thus, one aspect of the disclosure relates to a proximity detector integrated into, or in communication with, the home automation device or door lock to allow for activation of the projection based on detected user approach or proximity, for example by using motion sensing technology, without the need for direct user interaction with the device or lock system. In this way, a user walking past the home automation device or hurriedly leaving his home may receive home security, climate, and other relevant home automation system information quickly and efficiently without the need to stop at the device.

Accordingly, in one embodiment, a method for security and/or automation systems is provided. In one embodiment, the method may comprise detecting a proximity of a user at a home automation device, and projecting an external display of home automation system information from the home automation device onto a surface. The external display may be projected based, at least in part, on the detected proximity of the user to the home automation device.

In one aspect of the disclosure, a secondary home automation device having the projection mechanism may be positioned next to an entryway, while the primary home automation device may be more conveniently located at a central position in the home, for example in the kitchen or living room. In this way, users may easily access pertinent home automation system information from rooms that receive the most use, while still maintaining the ease of arming and disarming a security system or controlling home automation devices, for example, or receiving important system messages, near the primary point of entry and exit of the home. The secondary home automation device may be streamlined in design because no physical keypad or panel display may be required, such that the device may be minimally intrusive and such that home aesthetics may be achieved.

A further aspect of the disclosure relates to a keyless door locking mechanism having a projected keypad. The locking mechanism may resemble an ordinary lock, so as to avoid drawing unnecessary attention to the system. When a user approaches the lock, a keypad may be projected onto the door above, next to, or below the lock, such that the user may input his entry code at the keypad projection and lock or unlock the door. For safety purposes, in some embodiments the keypad may only be projected when an approaching user is in possession of an approved device that may be paired via Bluetooth, RFID, Wi-Fi, or any other acceptable means to the locking device. If an appropriately paired device is not detected, the lock system may not project the keypad, and unapproved users may be unable to unlock the door. In some embodiments, the keypad may only be projected when an authorized fingerprint or other biometric identification means is received at the locking device. In this way, security may be increased over standard keyed and keyless lock systems, which make available their locking mechanisms to all approaching users indiscriminately.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

The systems and methods described herein relate to projecting home automation system data. More specifically, the systems and methods described herein provide a means to project messages and interactive keypads onto surfaces such as walls, floors, ceilings, and doors, where the projections may be activated, at least in part, based on detected user approach or proximity to the projecting device.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
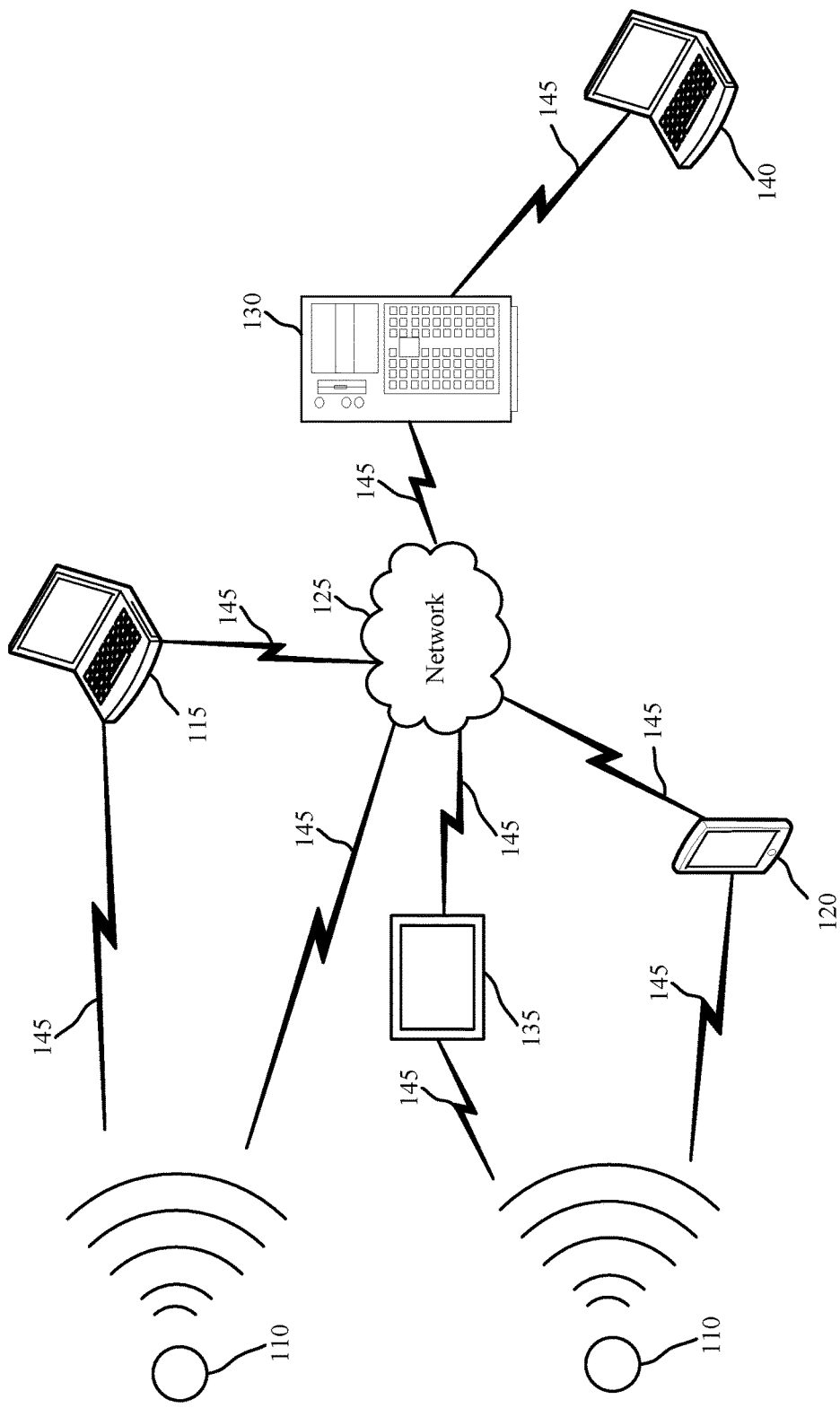
FIG. 1 is a block diagram of an example of a security and/or automation system in accordance with various embodiments.

FIG. 1 is an example of a home automation system 100 in accordance with various aspects of the disclosure. In some embodiments, the home automation system 100 may include one or more sensor units 110, local computing device 115, 120, network 125, server 130, control panel 135, and remote computing device 140. The network 125 may provide user authentication, encryption, access authorization, tracking, Internet Protocol (IP) connectivity, and other access, calculation, modification, and/or functions. The control panel 135 may interface with the network 125 through wired and/or wireless communication links 145 and may perform communication configuration, adjustment, and/or scheduling for communication with local computing device 115, 120 or remote computing device 140, or may operate under the control of a controller. Control panel 135 may communicate with a back end server 130—directly and/or indirectly—using one or more communication links 145.

The control panel 135 may wirelessly communicate via communication links 145 with the local computing device 115, 120 via one or more antennas (not shown). The control panel 135 may provide communication coverage for a geographic coverage area. In some examples, control panel 135 may be referred to as a control device, a base transceiver station, a radio base station, an access point, a radio transceiver, a home automation control panel, a smart home panel, or some other suitable terminology. The geographic coverage area for control panel 135 may be divided into sectors making up only a portion of the coverage area. The home automation system 100 may include one or more control panels 135 of different types. The control panel 135 may be related to one or more discrete structures (e.g., a home, a business) and each of the one more discrete structures may be related to one or more discrete areas. Control panel 135 may be a smart home system panel, for example an interactive panel mounted on a wall in a user's home. In other embodiments, control panel 135 may instead be a door locking mechanism. Control panel 135 may be in direct communication via wired or wireless communication links 145 with the one or more sensor units 110, or may receive sensor data from the one or more sensor units 110 via local computing devices 115, 120 and network 125, or may receive data via remote computing device 140, server 130, and network 125.

In any embodiment, control panel 135 may comprise a projection management module, described in more detail below with respect to FIG. 2A. The control panel 135 may be operable to project messages or interactive keypad displays onto a surface, and may further be operable to receive user input at the projected interactive keypad. The interactive keypad may comprise a series of numbers, letters, or figures, and may be operable to receive any of a security code or commands to operate home automation systems, such as turning on and off lights, changing thermostat settings, arming and disarming security systems, and the like. In some embodiments, the projected interactive keypad display may resemble the screen of a thermostat control or a light switch, such that users may receive information from and interact with the display much as they would a conventional thermostat or light switch.

The local computing devices 115, 120 may be dispersed throughout the home automation system 100 and each device 115, 120 may be stationary and/or mobile. Local computing devices 115, 120 and remote computing device 140 may be custom computing entities configured to interact with one or more sensor units 110 via network 125, and in some embodiments, via server 130. In other embodiments, local computing devices 115, 120 and remote computing device 140 may be general purpose computing entities. A device 115, 120 or 140 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a sensor, and/or the like. A device 115, 120 may also include or be referred to by those skilled in the art as a user device, a sensor, a smartphone, an iPod®, an iPad®, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. A local computing device 115, 120 and/or control panel 135 may include and/or be one or more sensors that sense: proximity, motion, temperatures, humidity, sound level, smoke, structural features (e.g., glass breaking, window position, door position), time, geo-location data of a user and/or a device, distance, biometrics, weight, speed, height, size, preferences, light, darkness, weather, time, system performance, and/or other inputs that relate to a security and/or an automation system. A local computing device 115, 120 may be able to communicate through one or more wired and/or wireless communication links 145 with various components such as control panels, base stations, and/or network equipment (e.g., servers, wireless communication points, etc.) and/or the like.

The communication links 145 shown in home automation system 100 may include uplink (UL) transmissions from a local computing device 115, 120 to a control panel 135, and/or downlink (DL) transmissions from a control panel 135 to a local computing device 115, 120. The downlink transmissions may also be called forward link transmissions while the uplink transmissions may also be called reverse link transmissions. Each communication link 145 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 145 may transmit bidirectional communications and/or unidirectional communications. Communication links 145 may include one or more connections, including but not limited to, 345 MHz, Wi-Fi, Bluetooth, cellular, Z Wave, 802.11, peer-to-peer, LAN, WLAN, Ethernet, fire wire, fiber optic, and/or other connection types related to security and/or automation systems.

In some embodiments of home automation system 100, control panel 135 and/or local computing devices 115, 120 may include one or more antennas for employing antenna diversity schemes to improve communication quality and reliability between control panel 135 and local computing devices 115, 120. Additionally or alternatively, control panel 135 and/or devices 115, 120 may employ multiple-input, multiple-output (MIMO) techniques that may take advantage of multi-path, mesh-type environments to transmit multiple spatial layers carrying the same or different coded data.

While the local computing devices 115, 120 may communicate with each other through the control panel 135 using communication links 145, each device 115, 120 may also communicate directly with one or more other devices via one or more direct communication links 145. Two or more local computing devices 115, 120 may communicate via a direct communication link 145 when both devices 115, 120 are in the geographic coverage area or when one or neither devices 115, 120 is within the geographic coverage area. Examples of direct communication links 145 may include Wi-Fi Direct, Bluetooth, wired, and/or other P2P group connections. The devices 115, 120 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within home automation system 100.

In some embodiments, one or more sensor units 110 may communicate via wired or wireless communication links 145 with one or more of the local computing device 115, 120 or network 125. The network 125 may communicate via wired or wireless communication links 145 with the control panel 135 and the remote computing device 140 via server 130. In alternate embodiments, the network 125 may be integrated with any one of the local computing device 115, 120, server 130, or remote computing device 140, such that separate components are not required. Additionally, in alternate embodiments, one or more sensor units 110 may be integrated with control panel 135, and/or control panel 135 may be integrated with local computing device 115, 120, such that separate components are not required.

The local computing devices 115, 120 and/or control panel 135 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing devices 115, 120 and/or control panel 135 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from one or more sensor units 110.

The processor of the local computing devices 115, 120 and/or control panel 135 may be operable to control operation of the output of the local computing devices 115, 120 and/or control panel 135. The output may be a television, a liquid crystal display (LCD) monitor, a cathode ray tube (CRT) monitor, speaker, tactile output device, and/or the like. In some embodiments, the output may be an interactive or non-interactive laser projection. In some embodiments, the output may be an integral component of the local computing devices 115, 120. Similarly stated, the output may be directly coupled to the processor. For example, the output may be the integral display of a tablet and/or smart phone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115, 120 and/or control panel 135 to the output.

The remote computing device 140 may be a computing entity operable to enable a remote user to monitor the output of the one or more sensor units 110. The remote computing device 140 may be functionally and/or structurally similar to the local computing devices 115, 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via communication links 145 and server 130.

In some embodiments, the one or more sensor units 110 may be sensors configured to conduct periodic or ongoing automatic measurements related to user approach or proximity to the one or more sensor units 110 and/or control panel 135. Each sensor unit 110 may be capable of sensing multiple proximity parameters, or alternatively, separate sensor units 110 may monitor separate proximity parameters. For example, one sensor unit 110 may measure user approach using motion sensors, while another sensor unit 110 (or, in some embodiments, the same sensor unit 110) may detect user proximity via heat or heartbeat detection. In some embodiments, one or more sensor units 110 may additionally monitor alternate proximity parameters, such as RFID or Bluetooth signals. In alternate embodiments, a user may input proximity data directly at the local computing device 115, 120 or at remote computing device 140. For example, a user may enter proximity data into a dedicated application on his smartphone indicating that he is returning home, and the control panel 135 may register that proximity accordingly. Alternatively or in addition, a GPS feature integrated with the dedicated application on the user's smartphone may communicate the user's proximity to his home automation system at the one or more sensor units 110 and/or control panel 135.

In some embodiments, the one or more sensor units 110 may be separate from the control panel 135, and may be positioned at various locations throughout the home or property. In other embodiments, the one or more sensor units 110 may be integrated or collocated with home automation system components or home appliances or fixtures. For example, a sensor unit 110 may be integrated with a doorbell system, or may be integrated with a front porch light. In other embodiments, a sensor unit 110 may be integrated with a wall outlet or switch. In still other embodiments, the one or more sensor units 110 may be integrated or collocated with the control panel 135 itself, as discussed in more detail below with respect to FIG. 5.

Data gathered by the one or more sensor units 110 may be communicated to local computing device 115, 120, which may be, in some embodiments, a thermostat or other wall-mounted input/output smart home display. In other embodiments, local computing device 115, 120 may be a personal computer or smartphone. Where local computing device 115, 120 is a smart phone, the smart phone may have a dedicated application directed to collecting user proximity data. The local computing device 115, 120 may process the data received from the one or more sensor units 110 to obtain instructions to project a message or interactive keypad at the control panel 135. In alternate embodiments, remote computing device 140 may process the data received from the one or more sensor units 110, via network 125 and server 130, to obtain instructions to project a message or interactive keypad at the control panel 135. Data transmission may occur via, for example, frequencies appropriate for a personal area network (such as Bluetooth or IR communications) or local or wide area network frequencies such as radio frequencies specified by the IEEE 802.15.4 standard.

In some embodiments, local computing device 115, 120 may communicate with remote computing device 140 or control panel 135 via network 125 and server 130. Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some embodiments, a user may access the functions of local computing device 115, 120 from remote computing device 140. For example, in some embodiments, remote computing device 140 may include a mobile application that interfaces with one or more functions of local computing device 115, 120.

The server 130 may be configured to communicate with the sensor units 110, the local computing devices 115, 120, the remote computing device 140 and control panel 135. The server 130 may perform additional processing on signals received from the one or more sensor units 110 or local computing devices 115, 120, or may simply forward the received information to the remote computing device 140 and control panel 135.

Server 130 may be a computing device operable to receive data streams (e.g., from one or more sensor units 110 and/or local computing device 115, 120 or remote computing device 140), store and/or process data, and/or transmit data and/or data summaries (e.g., to remote computing device 140). For example, server 130 may receive a stream of occupancy or user approach data based on motion detection from a sensor unit 110, a stream of occupancy or user approach data based on vibration monitoring from the same or a different sensor unit 110, and a stream of occupancy or user approach data derived from RFID signals from either the same or yet another sensor unit 110. In some embodiments, server 130 may "pull" the data streams, e.g., by querying the sensor units 110, the local computing devices 115, 120, and/or the control panel 135. In some embodiments, the data streams may be "pushed" from the sensor units 110 and/or the local computing devices 115, 120 to the server 130. For example, the sensor units 110 and/or the local computing device 115, 120 may be configured to transmit data as it is generated by or entered into that device. In some instances, the sensor units 110 and/or the local computing devices 115, 120 may periodically transmit data (e.g., as a block of data or as one or more data points).

The server 130 may include a database (e.g., in memory) containing user approach, occupancy or proximity data received from the sensor units 110 and/or the local computing devices 115, 120. Additionally, as described in further detail herein, software (e.g., stored in memory) may be executed on a processor of the server 130. Such software (executed on the processor) may be operable to cause the server 130 to monitor, process, summarize, present, and/or send a signal associated with user approach, occupancy or proximity data.

Figure 2A:
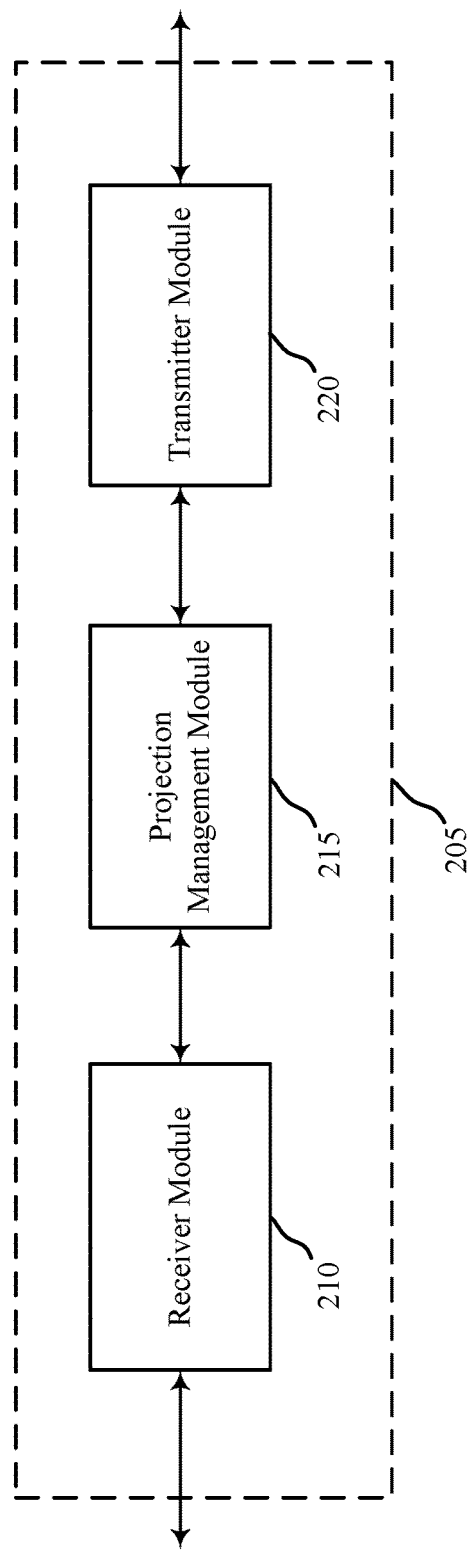
FIGS. 2A-2B show block diagrams of a device relating to a security and/or an automation system, in accordance with various aspects of this disclosure.

FIG. 2A shows a block diagram 200 of an apparatus 205 for use in security and/or automation systems, in accordance with various aspects of this disclosure. The apparatus 205 may be an example of one or more aspects of a control panel 135, or in other embodiments may be an example of one or more aspects of the one or more sensor units 110, both of which are described with reference to FIG. 1. The apparatus 205 may include any of a receiver module 210, a projection management module 215, and/or a transmitter module 220. The apparatus 205 may also be or include a processor. Each of these modules may be in communication with each other—directly and/or indirectly.

As previously discussed, in some embodiments, where apparatus 205 is a control panel, apparatus 205 may be a control panel in the form of, for example, an interactive home automation system display. In other embodiments, apparatus 205 may be a door locking mechanism, for example positioned on an outer surface of a door. In still other embodiments, apparatus 205 may be at least one sensor unit located adjacent to or remotely from the control panel or door locking mechanism at which the projection may be generated.

The components of the apparatus 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive user occupancy, approach, and/or proximity data. User proximity, approach, and/or occupancy information may be passed on to the projection management module 215, transmitter module 220, and to other components of the apparatus 205.

The components of the apparatus 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

Figure 2B:
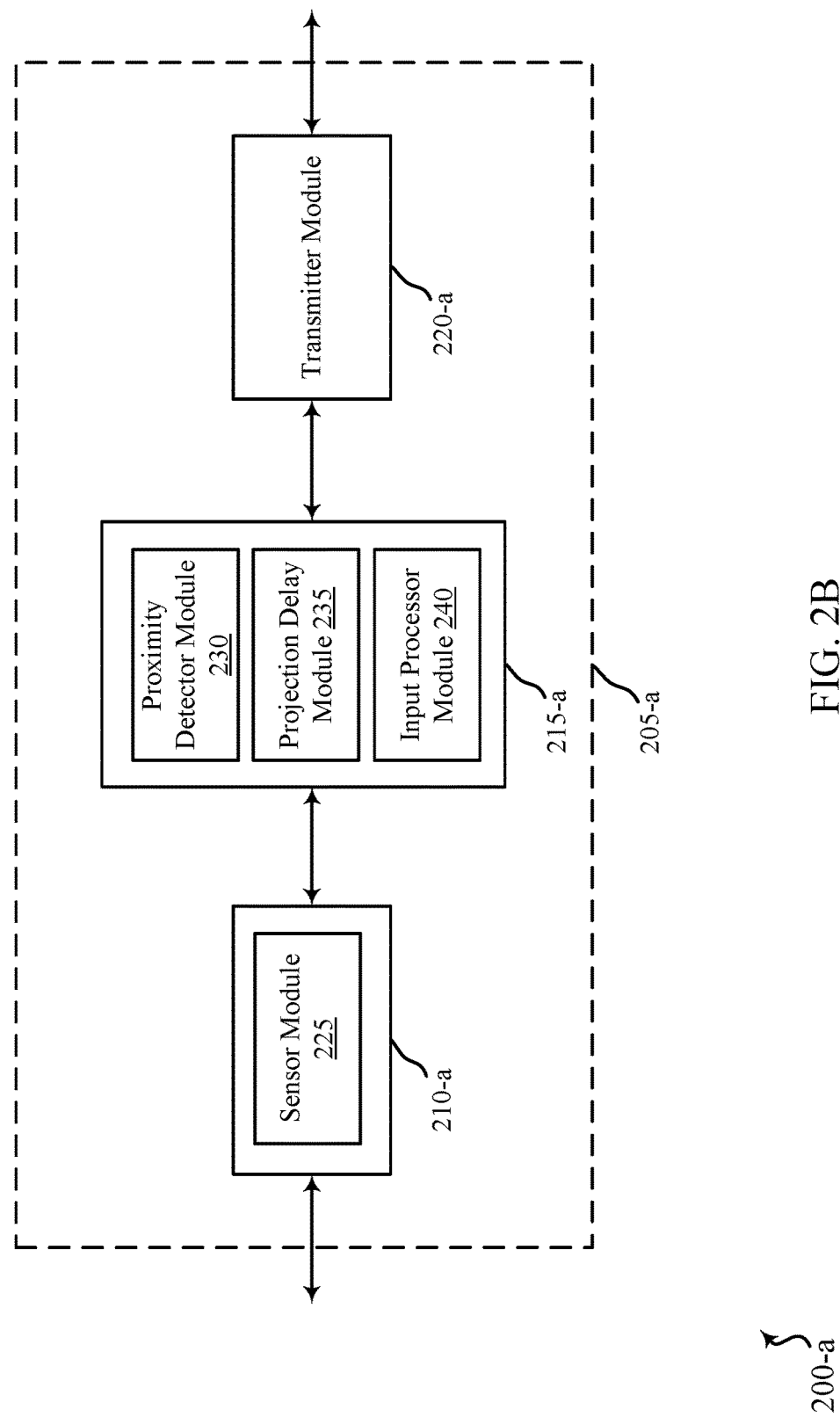

Apparatus 205-a, which may be an example of apparatus 205 illustrated in FIG. 2A, is further detailed in FIG. 2B. Apparatus 205-a may comprise any of receiver module 210-a, projection management module 215-a, and/or transmitter module 220-a, each of which may be examples of receiver module 210, projection management module 215, and transmitter module 220 as illustrated in FIG. 2A. Apparatus 205-a may comprise, as a component of receiver module 210-a, one or more sensor modules 225 configured to detect user proximity, approach, and/or occupancy data through a variety of means. For example, the one or more sensor modules 225 may detect user approach to the apparatus 205-a via any of a motion detector, vibration detector, heat or heartbeat detector, light detector, RFID or Bluetooth sensor, or a combination thereof. The user proximity or approach data sensed at the one or more sensor modules 225 may then be communicated to the projection management module 215-a. Projection management module 215-a may comprise any of proximity detector module 230, projection delay module 235, and/or input processor module 240.

The components of the apparatus 205-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

Based on the user proximity, approach, or occupancy data received at one or more sensor modules 225, proximity detector module 230 may calculate the proximity of the approaching user to the apparatus 205-a. The proximity calculation may then be communicated to projection delay module 235, which may calculate any delay required before projection of a message or interactive keypad should be initiated. For example, where apparatus 205-a is a control panel, proximity detector module 230 may detect that a user is approaching the control panel, but is still 10 feet away from the panel. Projection delay module 235 may therefore calculate, for example, a required two-second delay before projecting the message or interactive keypad, such that the message or interactive keypad may be displayed only when the user is close enough to read and/or interact with the message or keypad. The projection delay module 235 may continuously update the requisite time delay for projection based on continuously provided user approach or proximity data collected by one or more sensor module 225. In this way, if the user stops or slows down in his approach to the control panel, or decides not to approach the panel at all, a message or interactive keypad may not be unnecessarily projected. In other embodiments, proximity detector module 230 and projection delay module 235 may project a message or interactive keypad once a user has crossed a predetermined proximity threshold, such that the message is viewable by the user regardless of whether he is actually approaching the control panel, or is instead merely passing by the control panel. In another example, proximity detector module 230 may calculate that the user is already sufficiently close to the control panel, such that projection delay module 235 may provide for immediate projection of the message or interactive keypad, without the need for a delay. Projection management module 215-a may accordingly project the message or interactive keypad onto a surface adjacent to the control panel, such as a wall, ceiling, floor, door, or other suitable surface.

The projected message may include information relating to the home automation system, or may alternatively comprise any information relevant to the user. In some embodiments, the user may preselect preferences for the content of message displays by inputting preferences at, for example, the home automation system control panel or local computing device. For example, the user may elect to have relevant home security data displayed as he is approaching or passing by the system, such as messages relating to whether the system is armed or disarmed, whether any doors or windows are open, whether any alarms have been triggered, etc. The user may alternatively or in addition program reminders to display when he passes by the system, for example calendar-related reminders or reminders to bring his keys or phone, or to arm the system, upon leaving. In other embodiments, the home security system may automatically determine messages to project based on the state of the system, for example messages relating to low batteries, triggered alarms, current thermostat settings, approach of third parties to the front door or ringing the doorbell, and the like.

Where apparatus 205-*a* is a control panel or door locking mechanism, and further where the projected external display is an interactive keypad, input processor module 240 may be operable to receive user input at the interactive keypad. The interactive keypad may be projected by any means known in the art, for example by a laser or beamer, and may comprise a sensor or camera at the input processor module 240 to detect user input in the form of finger movements or gestures. In some embodiments, apparatus 205-*a* may be further operable to receive user input in the form of audible input. In some embodiments, two projections may be generated: a first, visible virtual keypad, and a second, invisible infrared beam above the virtual keypad, such that when a user moves his fingers or makes gestures in front of the invisible infrared beam, the user's finger or body breaks the beam and reflects light back to the projector. The reflected beam may pass through an infrared filter to the camera, and the camera may photograph the angle of incoming infrared light. The input processor module 240 may then determine where the infrared beam was broken, and may correlate that break to an action or character. For example, a user may input a security system arming code at the keypad projected at the control panel. In other embodiments, where apparatus 205-*a* is a door locking mechanism, a user may input a code to unlock or lock the door to which the door locking mechanism is affixed or with which the door locking mechanism is integrated. In still other embodiments, a user may input a command at the interactive keypad to turn on or off lights, or change the settings on a thermostat, or any other control functions for home automation systems.

Based, at least in part, on the user input received at input processor module 240, action instructions may be communicated from input processor module 240 to transmitter module 220-*a*. For example, a security system arming/disarming code inputted at the control panel and processed by input processor module 240 may be communicated to transmitter module 220-*a*, which may transmit action instructions to disarm a security alarm system at the home automation system. In some embodiments, apparatus 205-*a* may comprise a component of the home automation system, such that the action instructions to disarm the security alarm system may be processed locally. In other embodiments, apparatus 205-*a* may be a secondary control panel, and the action instructions may be communicated to the primary control panel to execute the action instructions and disarm the security alarm system. In some examples the transmitter module 220-*a* may be collocated with the receiver module 210-*a* in a transceiver module.

In other embodiments, apparatus 205-*a* may be an example of one or more sensor units 110, as illustrated in FIG. 1. The one or more sensor units may be located adjacent to or remotely from the control panel at which messages or interactive keypads are projected. Where apparatus 205-*a* is a sensor unit, sensor module 225 may detect user proximity, approach, or occupancy at the sensor unit. This proximity data may be communicated to proximity detector module 230, which may calculate the proximity of the user to the control panel based on the known distance of the sensor unit from the control panel. In order to calculate this proximity measurement, the home automation system may "know" or receive data indicating the precise location of each of the one or more sensor units and one or more control panels positioned throughout the home or property. Based on this calculated distance, projection delay module 235 may calculate a necessary time delay before activation of the projected message or interactive keypad, to allow time for the user to travel from the sensor unit to the control panel. In embodiments in which apparatus 205-*a* is a sensor unit, projection management module 215-*a* may not comprise input processor module 240, as any user input may instead take place at the control panel from which the message or interactive keypad is projected. Where apparatus 205-*a* is a sensor unit, transmitter module 220-*a* may transmit the calculated requisite time delay from projection delay module 235 to the control panel, such that the control panel may initiate the projection based, at least in part, on the calculated time delay data.

In some embodiments, home automation system 100, as illustrated in FIG. 1, may comprise one or more sensor units 110 and one or more control panels 135, where each of the sensor units and control panels are operable to detect user approach, occupancy, and/or proximity, such that the system may track users' movement toward or throughout the home or property, and may project messages or interactive keypads from one or more control panels positioned throughout the home. For example, one or more sensor units positioned at a front door of a home may communicate user approach data to a door locking mechanism positioned on the front door, wherein the door locking mechanism may project an interactive keypad for user entry based, at least in part, on the received user proximity or approach data. Moreover, user approach or proximity data detected at one or both of a sensor unit at the front door and the door locking mechanism may be communicated to a control panel positioned in the living room, such that a projection delay module in the control panel may calculate a time delay to allow the user time to enter the home and walk to the living room before projecting messages relating to home automation system information. If, for example, the user changes direction inside the home before reaching the living room, sensors positioned in, for example, a hallway, may send user proximity data to a control panel located in the user's bedroom, or whichever room the user is headed towards. A projection delay module of the control panel in the bedroom may again calculate a time delay to allow time for the user to pass from the hallway into the bedroom, and may project messages for the user accordingly. In this way, the home automation system may "follow" the user around the home and display pertinent information or needed keypads for the user in appropriate locations. This may serve to both conserve energy usage by displaying messages and keypads only in rooms where the user is detected, and may further provide for the convenience of projecting pertinent information to the user as he enters rooms, without the need for the user to interact directly with the control panel.

In some embodiments, messages or interactive keypads may be projected at the one or more control panels based on user occupancy patterns detected by the home automation system. For example, the home automation system may "learn," based on the data gathered by the one or more sensor units, that a user always returns home at 5:30 pm on weekdays, and may communicate action instructions to a door locking mechanism on the front door of the home to project a keypad at 5:30 pm every weekday. In another example, the home automation system may learn that a user is always in the living room between 8:00 and 10:00 pm, and may communicate action instructions to a control panel positioned in the living room to project messages containing relevant home automation system information during that time window.

In some embodiments, sensor module 225 may be further operable to identify and/or authenticate a user approaching the apparatus 205-*a* through a number of means. For example, sensor module 225 may receive signals via Bluetooth, RFID or Wi-Fi from a mobile smartphone, fob, or other device in the possession of the user, where the mobile device is linked to the apparatus 205-*a*, which may be a sensor or control panel. In other embodiments, the sensor module 225 may identify and/or authenticate the approaching user based on facial recognition technology and/or biosignature detecting technology. Where the signal from the mobile device or the facial recognition data detected at the sensor module 225 is authenticated as an approved user, the sensor module 225 may communicate action instructions to projection management module 215-*a* to display the message or interactive keypad. However, where the signal from the mobile device detected at the sensor module 225, or where the identity provided by the biosignature detecting technology, is not identified as an approved user, or in some embodiments, where no signal is detected from a mobile device at the sensor module 225, the sensor module 225 may communicate instructions to projection management module 215-*a* that no message or interactive keypad should be projected. In this way, unapproved users approaching, for example, a door locking mechanism positioned on or integrated with a homeowner's front door may not be provided with a projected keypad, such that the unapproved user may have no means by which to unlock the door.

In other embodiments, the type of projected message or interactive keypad may be tailored to the particular user identified. For example, approaching users identified as occupants of the home may be provided with more information in messages or more detailed interactive keypads than, for example, approaching users identified as delivery persons. Preferences for content of projection displays based on approaching user identities may be preselected by homeowners based on, for example, input at the home automation system, or may be derived by the home automation system automatically based on detected patterns. For example, the home automation system may assume that persons approaching the front door during the hours of 9:00 am to 5:00 pm on weekdays are delivery persons and not the homeowners, based on detected homeowner occupancy data patterns, and may accordingly display information and/or keypads at the front door tailored to the delivery persons.

Figure 3:
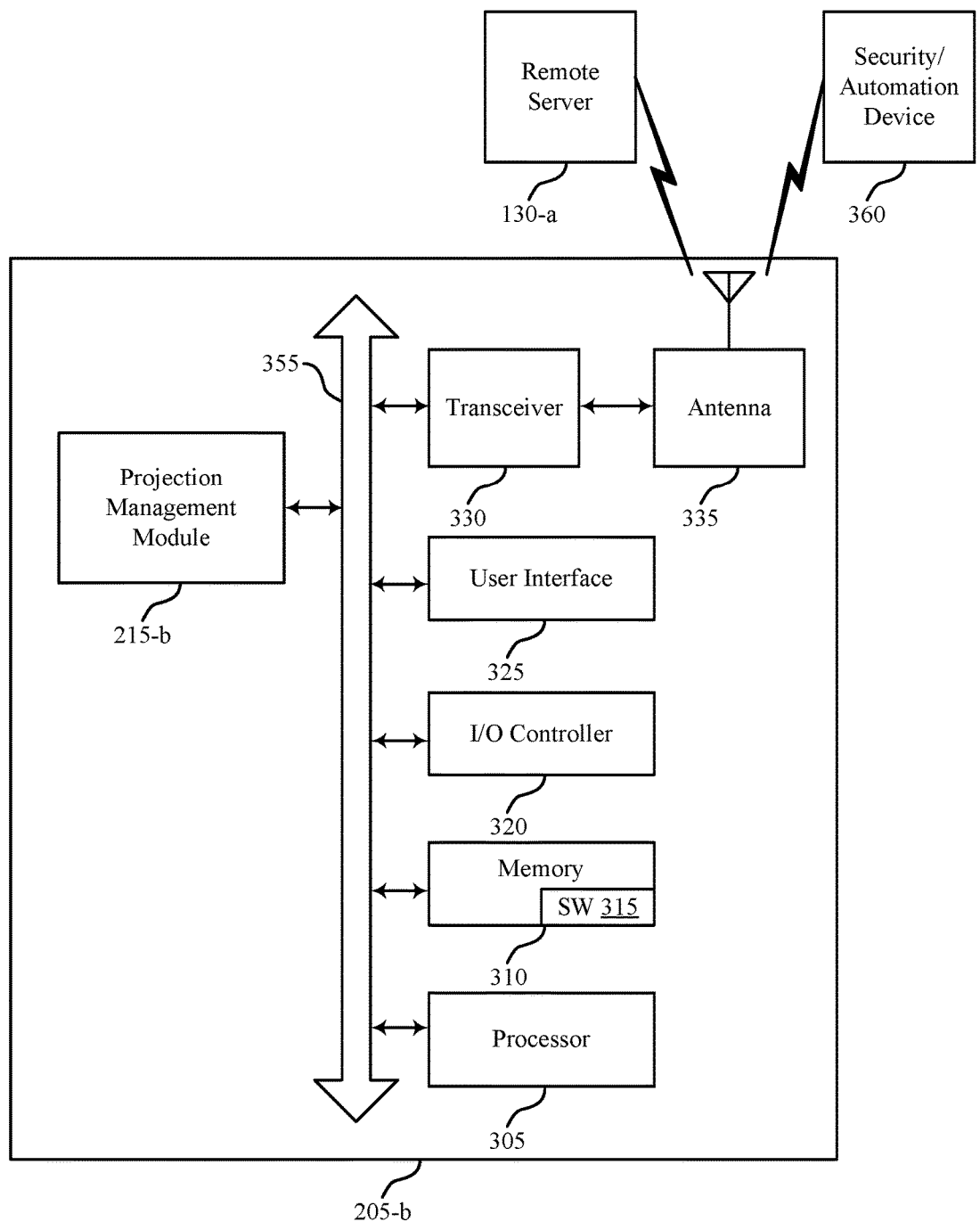
FIG. 3 shows a block diagram of a device relating to a security and/or an automation system, in accordance with various aspects of this disclosure.

FIG. 3 shows a system 300 for use in home automation system method and interactive keypad projection systems, in accordance with various examples. System 300 may include an apparatus 205-*b*, which may be an example of the control panel 135 and/or one or more sensor units 110 of FIG. 1. Apparatus 205-*b* may also be an example of one or more aspects of apparatus 205 and/or 205-*a* of FIGS. 2A and 2B. Apparatus 205-*b* may include projection management module 215-*b*, which may be an example of projection management module 215, 215-*a* described with reference to FIGS. 2A and 2B.

Apparatus 205-*b* may also include components for bi-directional voice and data communications including components for transmitting communications and components for receiving communications. For example apparatus 205-*b* may communicate bi-directionally with one or more of security/automation device 360 or remote server 130-*a*. This bi-directional communication may be direct (e.g., apparatus 205-*b* communicating directly with remote server 130-*a*) or indirect. Remote server 130-*a* may be an example of remote server 130 shown with respect to FIG. 1.

The projection management module 215-*b* may receive user approach, proximity, and/or occupancy data based, at least in part, on data received at one or more sensor units, and may utilize that data to process a projection of a message or interactive keypad, as described above with reference to FIGS. 2A-2B. For example, projection management module 215-*b* may receive user proximity data from one or more sensor units located separately from a control panel, and may process a projection display time delay at projection management module 215-*b* based on the known distance of the user-detecting sensor unit from the control panel. Based on this calculated projection display time delay, a message or interactive keypad may be projected at the control panel at a time coinciding with user approach or proximity to the control panel. Where the one or more sensor units are collocated with the control panel, a lesser projection display time delay may be needed, or no projection delay may be required at all.

Apparatus 205-*b* may also include a processor module 305, and memory 310 (including software (SW) 315), an input/output controller module 320, a user interface module 325, a transceiver module 330, and one or more antennas 335, each of which may communicate—directly or indirectly—with one another (e.g., via one or more buses 355). The transceiver module 330 may communicate bi-directionally—via the one or more antennas 335, wired links, and/or wireless links—with one or more networks or remote devices as described above. For example, the transceiver module 330 may communicate bi-directionally with one or more of remote server 130-*a* or security/automation device 360. The transceiver module 330 may include a modem to modulate the packets and provide the modulated packets to the one or more antennas 335 for transmission, and to demodulate packets received from the one or more antennas 335. While an apparatus comprising a sensor unit or control panel (e.g., 205-*b*) may include a single antenna 335, the apparatus may also have multiple antennas 335 capable of concurrently transmitting or receiving multiple wired and/or wireless transmissions. In some embodiments, one element of apparatus 205-*b* (e.g., one or more antennas 335, transceiver module 330, etc.) may provide a direct connection to a remote server 130-*a* via a direct network link to the Internet via a POP (point of presence). In some embodiments, one element of apparatus 205-*b* (e.g., one or more antennas 335, transceiver module 330, etc.) may provide a connection using wireless techniques, including digital cellular telephone connection, Cellular Digital Packet Data (CDPD) connection, digital satellite data connection, and/or another connection.

The signals associated with system 300 may include wireless communication signals such as radio frequency, electromagnetics, local area network (LAN), wide area network (WAN), virtual private network (VPN), wireless network (using 802.11, for example), 345 MHz, Z Wave, cellular network (using 3G and/or LTE, for example), and/or other signals. The one or more antennas 335 and/or transceiver module 330 may include or be related to, but are not limited to, WWAN (GSM, CDMA, and WCDMA), WLAN (including Bluetooth and Wi-Fi), WMAN (WiMAX), antennas for mobile communications, antennas for Wireless Personal Area Network (WPAN) applications (including RFID and UWB). In some embodiments each antenna 335 may receive signals or information specific and/or exclusive to itself. In other embodiments each antenna 335 may receive signals or information not specific or exclusive to itself.

In some embodiments, the user interface module 325 may include an audio device, such as an external speaker system, an external display device such as a display screen, and/or an input device (e.g., remote control device interfaced with the user interface module 325 directly and/or through I/O controller module 320).

One or more buses 355 may allow data communication between one or more elements of apparatus 205-b (e.g., processor module 305, memory 310, I/O controller module 320, user interface module 325, etc.).

The memory 310 may include random access memory (RAM), read only memory (ROM), flash RAM, and/or other types. The memory 310 may store computer-readable, computer-executable software/firmware code 315 including instructions that, when executed, cause the processor module 305 to perform various functions described in this disclosure (e.g., detect user approach and/or proximity at a sensor unit and/or control panel, calculate a projection delay based on detected user proximity and distance between the user and the control panel, communicate action instructions based on detected user input at the projection, etc.). Alternatively, the software/firmware code 315 may not be directly executable by the processor module 305 but may cause a computer (e.g., when compiled and executed) to perform functions described herein.

In some embodiments the processor module 305 may include, among other things, an intelligent hardware device (e.g., a central processing unit (CPU), a microcontroller, and/or an ASIC, etc.). The memory 310 can contain, among other things, the Basic Input-Output system (BIOS) which may control basic hardware and/or software operation such as the interaction with peripheral components or devices. For example, the projection management module 215-b to implement the present systems and methods may be stored within the system memory 310. Applications resident with system 300 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 330, one or more antennas 335, etc.).

The memory 310 may include random access memory (RAM) and read-only memory (ROM). The memory 310 may store computer-readable, computer-executable software/firmware code 315 containing instructions that are configured to, when executed, cause the processor module 305 to perform various functions described herein (e.g., detect user approach and/or proximity at a sensor unit and/or control panel, calculate a projection delay based on detected user proximity and distance between the user and the control panel, communicate action instructions based on detected user input at the projection, etc.). Alternatively, the computer-readable, computer-executable software/firmware code 315 may not be directly executable by the processor module 305 but may be configured to cause a computer (e.g., when compiled and executed) to perform functions described herein. The processor module 305 may include an intelligent hardware device, e.g., a central processing unit (CPU), a microcontroller, an application-specific integrated circuit (ASIC), etc.

Many other devices and/or subsystems may be connected to, or may be included as, one or more elements of system 300 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments all of the elements shown in FIG. 3 need not be present to practice the present systems and methods. The devices and subsystems can be interconnected in different ways from that shown in FIG. 3. In some embodiments, an aspect of some operation of a system, such as that shown in FIG. 3, may be readily known in the art and is not discussed in detail in this disclosure. Code to implement the present disclosure can be stored in a non-transitory computer-readable medium such as one or more of system memory 310 or other memory. The operating system provided on I/O controller module 320 may be iOS®, ANDROID®, MS-dOS®, MS-WINDOWS®, OS/2®, UNIX®, LINUX®, or another known operating system.

The transceiver module 330 may include a modem configured to modulate the packets and provide the modulated packets to the antennas 335 for transmission and/or to demodulate packets received from the antennas 335. While the apparatus 205-b may include a single antenna 335, the apparatus 205-b may have multiple antennas 335 capable of concurrently transmitting and/or receiving multiple wireless transmissions.

The components of the apparatus 205-b may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

Figure 4:
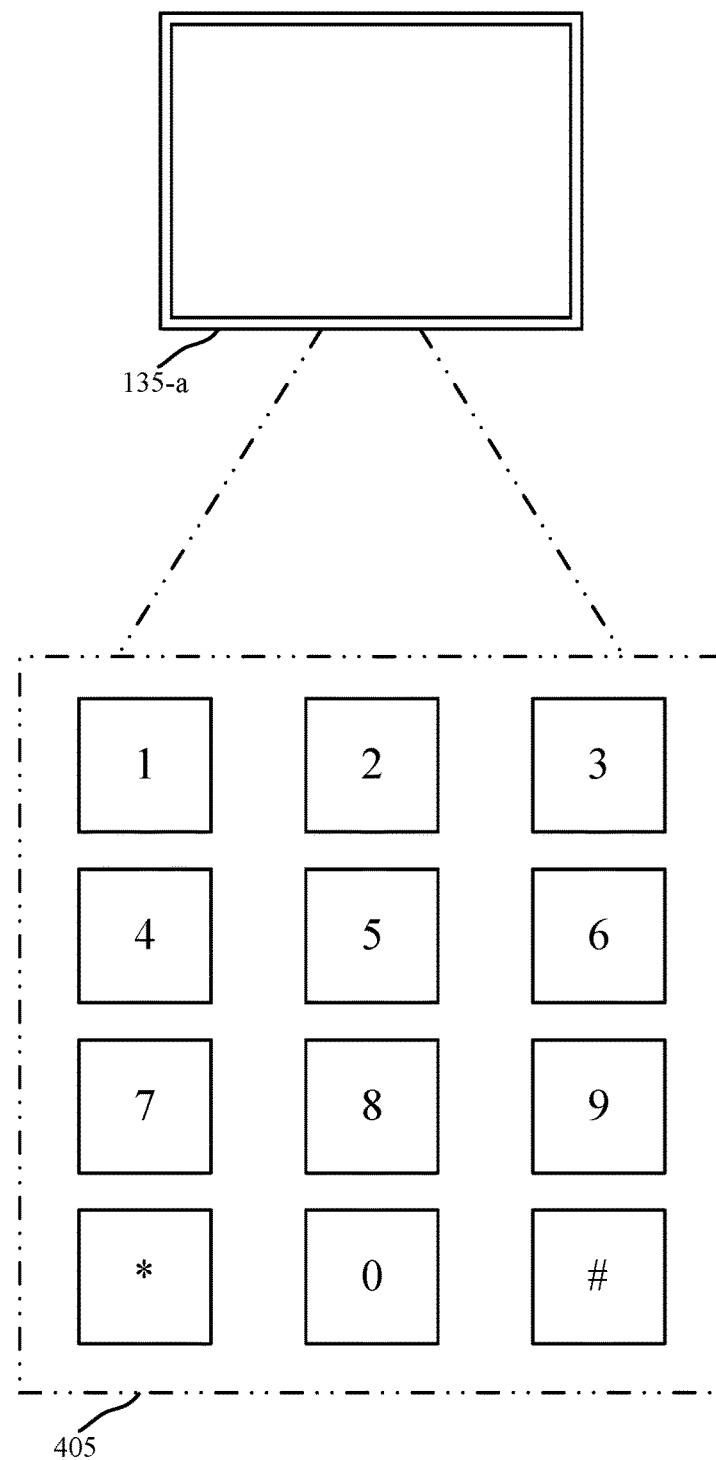
FIG. 4 is a block diagram of an example of a keypad projected from a home automation device, in accordance with various aspects of this disclosure.

FIG. 4 is a block diagram 400 showing an example of a control panel 135-a for projecting external messages and/or interactive keypads onto a surface, as described above. In any embodiment, control panel 135-a may be an example of the one or more control panels 135 illustrated with respect to FIG. 1. In the illustrated embodiment, control panel 135-a may project an interactive keypad 405 onto a surface adjacent to the control panel 135-a. For example, where control panel 135-a is wall-mounted, interactive keypad 405 may be projected onto the wall on which the control panel 135-a is mounted, a wall adjacent to or across from the wall on which the control panel 135-a is mounted, or a floor or ceiling adjacent to the wall on which the control panel 135-a is mounted. In other embodiments, where control panel 135-a is handheld or portable, interactive keypad 405 may be projected onto any opaque surface adjacent to the control panel 135-a.

In the embodiment shown in FIG. 4, the interactive keypad 405 is shown having a plurality of virtual number keys. In other embodiments, the interactive keypad 405 may comprise any combination of letters, numbers, or symbols operable to control home automation systems, or may alternatively comprise a displayed message showing, for example, home automation system information. Control panel 135-a may, in some embodiments, be operable to receive and process user input in the form of "typing" on the virtual keypad, or alternatively in the form of gestures detected at the control panel 135-a, as discussed in more detail below with respect to FIG. 5.

In some embodiments, control panel 135-a may comprise a solid box or object of any size or shape, not having any buttons, displays, or controls for user input. In this way, the control panel 135-a may be designed to be minimally visually intrusive on the décor of the home. In other embodiments, the control panel 135-*a* may comprise any number or combination of buttons or displays operable to receive and process user input.

In some embodiments, control panel 135-*a* may further comprise a fingerprint scanner or other biometric identifying means, such that the interactive keypad 405 may only be displayed to authorized users.

Figure 5:
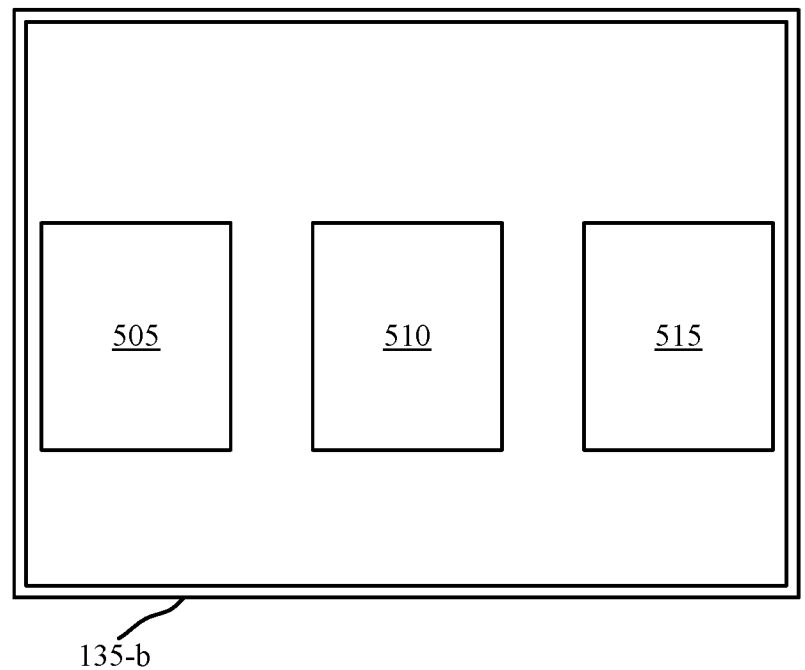
FIG. 5 is a block diagram of an example of a home automation device panel, in accordance with various aspects of this disclosure.

FIG. 5 is a block diagram 500 illustrating an example of a control panel 135-*b* for projecting messages and/or interactive keypads. As previously discussed, in some embodiments, control panel 135-*b* may comprise only a box or other object of any size or shape having only a projection means and a user input detection means, and not comprising any buttons, displays, or controls for direct user input. In other embodiments, as illustrated in FIG. 5, control panel 135-*b* may comprise a receiver module 505, projection management module 510, and transmitter module 515, which may be examples of receiver module 210, 210-*a*, projection management module 215, 215-*a*, and transmitter module 220, 220-*a*, respectively, as illustrated in FIGS. 2A-2B. In some embodiments, control panel 135-*b* may additionally comprise a display.

As previously discussed with respect to FIGS. 2A-2B, receiver module 505 may receive user proximity, occupancy, or approach data from one or more sensors integrated with the control panel 135-*b*, or alternatively from one or more sensor units located adjacent to or positioned remotely from the control panel 135-*b*. Receiver module 505 may communicate the user proximity data to projection management module 510, which may calculate a proximity of the user to the control panel 135-*b* based on the received data, and may further calculate a projection delay based on the proximity data, such that a projection is only initiated when the user is immediately in front of our passing by the control panel 135-*b*. Projection management module 510 may then project a message or interactive keypad at the control panel 135-*b* onto a wall, ceiling, floor, door, or other appropriate opaque surface adjacent to or across from the control panel 135-*b*. A user may simply read the projected message, or may interact with the projected keypad. Projection management module 510 may therefore be operable to process user input at the projected virtual keypad, in the form of user finger movements or gestures. Projection management module 510 may communicate the user input data to transmitter module 515. In some embodiments, transmitter module 515 may communicate action instructions to a display on the control panel 135-*b*, which may be an LED or other visual display screen, to display information corresponding to the user's input. For example, a user inputting a disarming code at the virtual keypad may be shown a "SYSTEM DISARMED" message on the display. Alternatively or in addition, transmitter module 515 may communicate action instructions to a remote computing device or home automation system to execute action instructions based on the user input, for example to arm or disarm a security system, change a thermostat setting, or the like. In still other embodiments, where control panel 135-*b* is a door locking mechanism, transmitter module 515 may communicate a "door unlock" action instruction to the locking mechanism with which the control panel 135-*b* is integrated or collocated.

The components of the control panel 135-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

Figure 6:
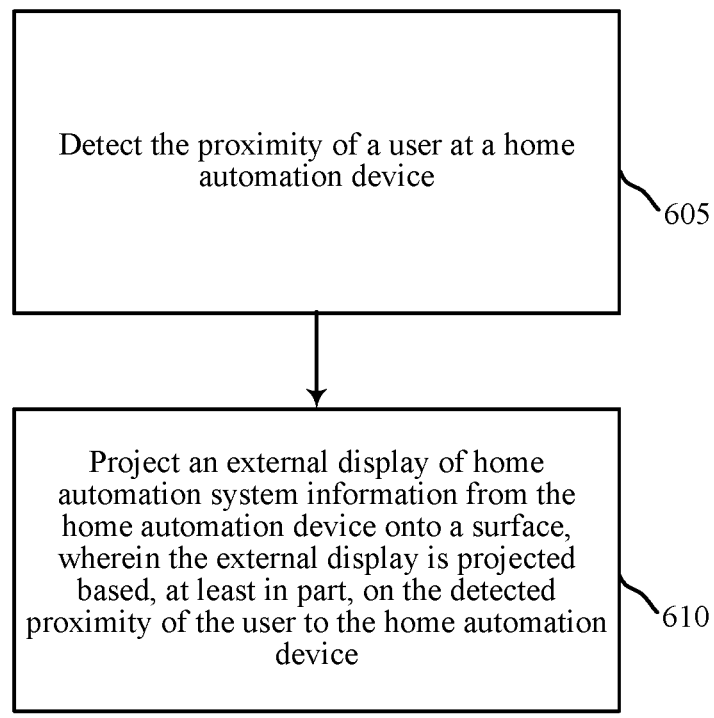
FIG. 6 is a flow chart illustrating an example of a method relating to a security and/or an automation system, in accordance with various aspects of this disclosure.

FIG. 6 is a flow chart illustrating an example of a method 600 for projecting an external display at a control panel as part of a home automation system, in accordance with various aspects of the present disclosure. For clarity, the method 600 is described below with reference to aspects of one or more of the sensor units 110 and control panel 135 described with reference to FIGS. 1-5, and/or aspects of one or more of the apparatus 205, 205-*a* described with reference to FIGS. 2A-2B. In some examples, a control panel and/or sensor unit may execute one or more sets of codes to control the functional elements described below. Additionally or alternatively, the control panel and/or sensor unit may perform one or more of the functions described below using special-purpose hardware.

At block 605, the method 600 may include detecting the proximity of a user at a home automation device. The home automation device may comprise a control panel, or alternatively may comprise a door locking mechanism. As previously discussed, user proximity may be detected by one or more sensor units, where the sensor units may be integrated with or separate from the home automation device. Where the one or more sensor units are positioned separately from the home automation device, the user proximity data may be communicated, for example via wired or wireless communication links, to the home automation device.

User proximity at the home automation device may be detected using any acceptable means, including detecting motion, vibration, heat or heartbeat, or the like. In addition or alternatively, user proximity may be detected by sensing Bluetooth, RFID, Wi-Fi, or other wireless signals emitted from a device, such as a fob or mobile device, in the user's possession.

At block 610, the method 600 may include projecting an external display of home automation system information from the home automation device onto a surface, wherein the external display is projected based, at least in part, on the detected proximity of the user to the home automation device. The external display may comprise a message containing information relating to the home automation system, or may alternatively comprise an interactive keypad. By projecting an external display based, at least in part, on detected user proximity, energy resources may be conserved. In particular, projections may be initiated only when a user is present to view the projections. In addition, by projecting an external display based, at least in part, on detected user proximity, a user may view projected messages without the need to interact directly with the device, for example to turn the device on or off.

The operations at blocks 605 and 610 may be performed using the receiver module 210, 210-*a*, 505, the projection management module 215, 215-*a*, 510, and/or the transmitter module 220, 220-*a*, 515, described with reference to FIGS. 2A-2B and 5.

Thus, the method 600 may provide for external projection methods relating to home automation/security systems. It should be noted that the method 600 is just one implementation and that the operations of the method 600 may be rearranged or otherwise modified such that other implementations are possible.

Figure 7:
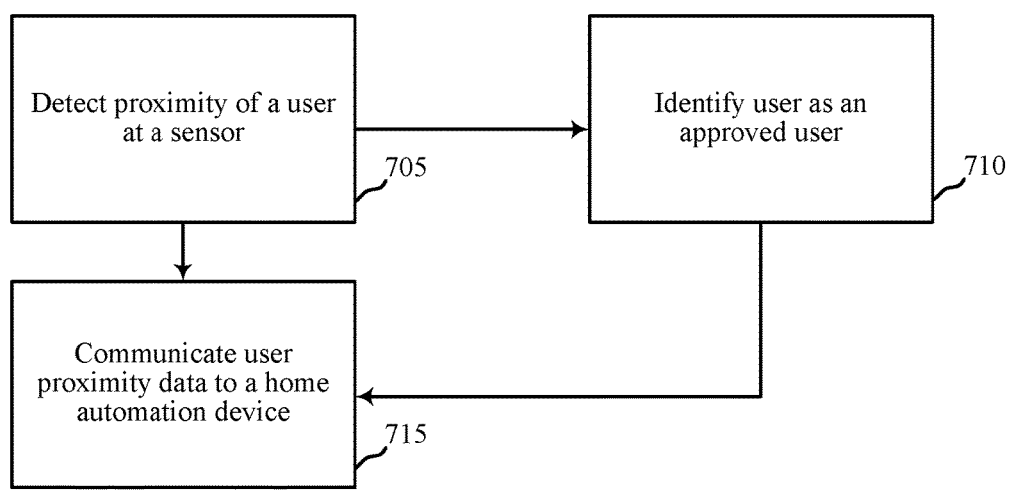
FIG. 7 is a flow chart illustrating an example of a method relating to a security and/or an automation system, in accordance with various aspects of this disclosure.

FIG. 7 is a flowchart illustrating an example of a method 700 for detecting user proximity at a sensor unit, in accordance with various aspects of the present disclosure. For clarity, the method 700 is described below with reference to aspects of one or more of the sensor units 110 and control panel 135 described with reference to FIGS. 1-5, and/or aspects of one or more of the apparatus 205, 205-*a* described with reference to FIGS. 2A-2B. In some examples, a control panel and/or sensor unit may execute one or more sets of codes to control the functional elements described below. Additionally or alternatively, the control panel and/or sensor unit may perform one or more of the functions described below using special-purpose hardware.

At block 705, method 700 may include detecting proximity of a user at a sensor. As previously discussed, one or more sensors may be integrated with or collocated at a home automation device, where the home automation device may comprise a control panel or door locking mechanism. In other embodiments, one or more sensor units may be positioned separately from the home automation device, and any user proximity data detected at the one or more sensor units may be communicated, for example via wired or wireless communication links, to the home automation device.

At block 710, method 700 may include identifying the user as an approved user. This may be achieved by any appropriate means. In some examples, the one or more sensor units may detect user identity by biosignature detecting technology. In other embodiments, the one or more sensor units may detect user identity by detecting signals transmitted from a mobile device in the approaching user's possession. For example, the mobile device may comprise a smartphone or fob emitting any of a Bluetooth, RFID, Wi-Fi, or other acceptable wireless signal. The one or more sensor units may identify the user as an approved user based, at least in part, on an authenticated signal received from the mobile device.

At block 715, method 700 may comprise communicating user proximity data to a home automation device. Where the sensor unit is collocated or integrated with the home automation device, this communication may occur between modules comprising the home automation device, as previously discussed with regard to FIGS. 2A-2B. Alternatively, where the one or more sensor units are positioned remotely from the home automation device, the proximity data of the approved user may be communicated to the home automation device, for example via a wired or wireless communication link. Where a user is not identified as an approved user at block 710, no external projection may be initiated at the home automation device.

In some embodiments, the approaching user's identity need not be authenticated, and method 700 may proceed directly from block 705 to block 715, such that user proximity data is detected and communicated to the home automation device.

Figure 8:
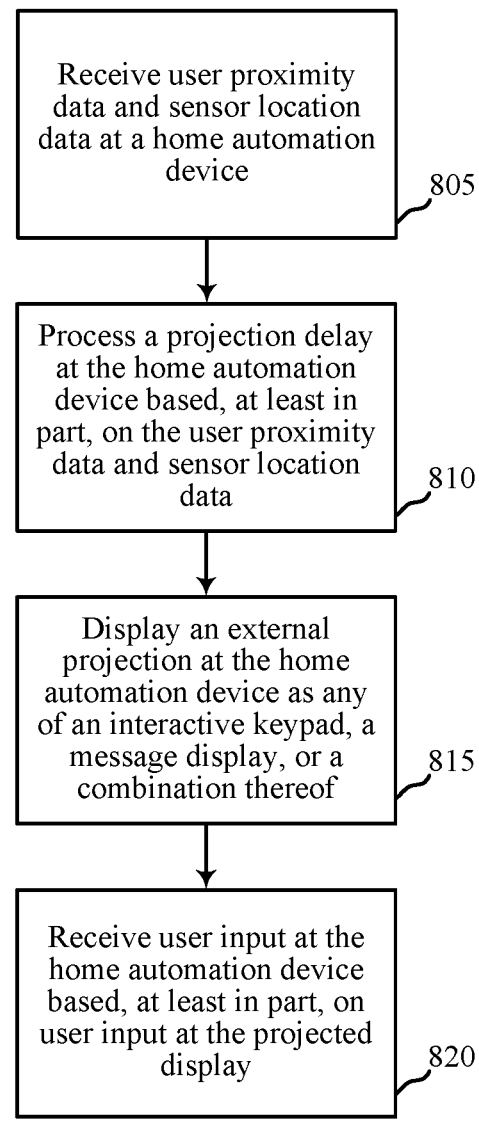
FIG. 8 is a flow chart illustrating an example of a method relating to a security and/or an automation system, in accordance with various aspects of this disclosure.

FIG. 8 is a flowchart illustrating an example of a method 800 for receiving user input at a projected display, in accordance with various aspects of the present disclosure. For clarity, the method 800 is described below with reference to aspects of one or more of the sensor units 110 and control panel 135 described with reference to FIGS. 1-5, and/or aspects of one or more of the apparatus 205, 205-*a* described with reference to FIGS. 2A-2B. In some examples, a control panel and/or sensor unit may execute one or more sets of codes to control the functional elements described below. Additionally or alternatively, the control panel and/or sensor unit may perform one or more of the functions described below using special-purpose hardware.

At block 805, method 800 may include receiving user proximity data and sensor location data at a home automation device. As previously discussed, user proximity data may be detected by one or more sensor units. In some embodiments, the one or more sensor units may be collocated or integrated with the home automation device. In other embodiments, the one or more sensor units may be positioned remotely from the home automation device. Where the one or more sensor units are positioned remotely from the home automation device, the one or more sensor units may transmit, along with user proximity data, sensor location data to the home automation system. In other embodiments, sensor location information may be received at the home automation device from a local or remote computing device. User proximity data may be detected by any known means, including by detecting motion, vibration, heat or heartbeat, or biosignals, or a combination thereof. Alternatively or in addition, user proximity may be detected by receiving signals transmitted from a mobile device, such as a smartphone or fob.

At block 810, method 800 may include processing a projection delay at the home automation device based, at least in part, on the user proximity data and sensor location data. As previously described with respect to FIG. 2B, a proximity detector module and projection delay module may be used to calculate a projection delay time period based on user proximity to a sensor unit, and further based on a distance of the sensor unit from the control panel which will initiate the projection. For example, a sensor unit positioned at a front door may detect user approach to the front door. The sensor unit may communicate the user approach data to a control panel located in a living room. A proximity detector module and projection delay module comprising the control panel may then process a projection delay based, at least in part, on the user proximity data and sensor location data, such that the projection is initiated only after the user has had sufficient time to travel from the sensor unit at the front door to the control panel in the living room. In other embodiments, user proximity may be detected directly at a control panel and, depending upon the proximity of the user to the control panel, no projection delay may be necessary, and projection may be initiated immediately upon user proximity detection. In this way, messages and/or interactive keypads may be projected at home automation devices only when the user is positioned close enough to the home automation device to see and/or interact with the projection. In some embodiments, this proximity may allow for user approach to and interaction with the home automation device, whereas in other embodiments, this proximity may allow for a user to view a projected message as he passes by the home automation device, without stopping at or interacting with the home automation device.

At block 815, method 800 may include displaying an external projection at the home automation device as any of an interactive keypad, a message display, or a combination thereof. At block 820, method 800 may include receiving user input at the home automation device based, at least in part, on user input at the projected display. As previously discussed with respect to FIG. 2B, an input processor module at the home automation device may receive and process user input at the projected display in the form of user "typing" at the projected virtual keypad, or in the form of user gestures. User input received and processed by the input processor module may then be translated into action instructions, for example instructions to lock or unlock a door, arm or disarm a security system, turn lights on or off, or the like. In some embodiments, the action instructions may be executed locally at the home automation system, or in other embodiments may be communicated to a remote computing device or remote home automation system for execution.

In some examples, aspects from two or more of the methods 600, 700, 800 may be combined and/or separated. It should be noted that the methods 600, 700, 800 are just example implementations, and that the operations of the methods 600-800 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for security and/or automation systems, comprising:
   detecting an occupant of a premises in an initial area of the premises;
   detecting the occupant satisfying a proximity threshold in relation to an automation device in a room of the premises;
   implementing a time delay before initiating a projection of automation system information based at least in part on a distance between the initial area and the room; and
   projecting the automation system information from the automation device onto a surface of the room upon detecting the occupant satisfying the proximity threshold.

2. The method of claim 1, further comprising:
   receiving input at the automation device based, at least in part, on input from the occupant in relation to the projected automation system information.

3. The method of claim 2, further comprising:
   deactivating the projecting of the automation system information after an exit time delay, after detecting the occupant exiting the room, after the occupant no longer satisfies the proximity threshold, or any combination thereof, wherein the input received at the automation device is any one of a user passcode, audible input, a gesture, or a combination thereof.

4. The method of claim 1, wherein satisfying the proximity threshold at the automation device is detected by any one of a motion detector, an infrared or near-infrared sensor, a video camera, a facial recognition sensor, an RFID sensor, a vibration detector, or detection of a mobile device coupled to the automation device by Bluetooth or wireless connectivity, or a combination thereof.

5. The method of claim 1, wherein the automation device is any one of a smart panel, a door locking mechanism, or a combination thereof.

6. The method of claim 1, wherein the automation device is mounted on any one of a wall, floor, ceiling, door, or a combination thereof.

7. The method of claim 1, wherein the surface onto which the external display is projected is any one of a wall, floor, ceiling, door, or a combination thereof.

8. The method of claim 1, wherein the projected information is any one of an interactive keypad, a message display, or a combination thereof.

9. The method of claim 1, further comprising:
   identifying the occupant at the automation device based, at least in part, on any one of facial recognition, RFID coupling, smartphone coupling, or a combination thereof.

10. The method of claim 9, wherein the information is projected only upon identification of an authorized occupant.

11. The method of claim 9, wherein the information projected is specific to the identified occupant.

12. An apparatus for security and/or automation systems, comprising:
   a processor;
   memory in electronic communication with the processor; and
   instructions stored in the memory, the instructions being executable by the processor to:
   detect an occupant of a premises in an initial area of the premises;
   detect the occupant satisfying a proximity threshold in relation to an automation device in a room of the premises;
   implement a time delay before initiating a projection of automation system information based at least in part on a distance between the initial area and the room; and
   project the automation system information from the automation device onto a surface of the room upon detecting the occupant satisfying the proximity threshold.

13. The apparatus of claim 12, further comprising:
   a receiver to receive input at the automation device based, at least in part, on input from the occupant in relation to the projected automation system information.

14. The apparatus of claim 12, further comprising:
   an occupant identity detector.

15. The apparatus of claim 14, wherein the occupant identity detector is any one of a facial recognition sensor, an RFID sensor, a smartphone sensor, or a combination thereof.

16. The apparatus of claim 14, wherein the information is projected only upon identification of an approved occupant.

17. The apparatus of claim 14, wherein the information projected is specific to the identified occupant.

18. The apparatus of claim 12, wherein the automation device is any one of a control panel, a door locking mechanism, or a combination thereof.

19. The apparatus of claim 12, wherein the projected information is any one of an interactive keypad, a message display, or a combination thereof.

20. A non-transitory computer-readable medium storing computer-executable code for security and/or automation systems, the code executable by a processor to:
   detect an occupant of a premises in an initial area of the premises;
   detect the occupant satisfying a proximity threshold in relation to an automation device in a room of the premises;
   implement a time delay before initiating a projection of automation system information based at least in part on a distance between the initial area and the room; and project the automation system information from the automation device onto a surface of the room upon detecting the occupant satisfying the proximity threshold.

\* \* \* \* \*